(12) United States Patent
Stevenson et al.

(10) Patent No.: US 6,868,597 B2
(45) Date of Patent: Mar. 22, 2005

(54) BLIND RIVET WITH ADHESIVE FOR JOINING AND ADHESIVE CHARGING METHOD

(75) Inventors: Robin Stevenson, Bloomfield, MI (US); Pei-Chung Wang, Troy, MI (US); Jessica A. Schroeder, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 34 days.

(21) Appl. No.: 10/426,904

(22) Filed: Apr. 29, 2003

(65) Prior Publication Data

US 2004/0218990 A1 Nov. 4, 2004

(51) Int. Cl.⁷ .................................................. B23P 19/04
(52) U.S. Cl. ........................ 29/460; 29/530; 29/525.13; 411/82
(58) Field of Search ...................... 29/460, 530, 525.06, 29/525.13; 411/82, 82.1, 501; 427/230, 238

(56) References Cited

U.S. PATENT DOCUMENTS

| | | | | |
|---|---|---|---|---|
| 3,472,301 A | | 10/1969 | Pearce, Jr. .................. | 151/14.5 |
| 3,772,957 A | | 11/1973 | Newton .......................... | 85/68 |
| 4,063,582 A | * | 12/1977 | Fischer ....................... | 411/82.1 |
| 4,114,654 A | * | 9/1978 | Richardson .................. | 411/82 |
| 4,129,935 A | * | 12/1978 | Daley .......................... | 29/460 |
| 4,659,268 A | | 4/1987 | Del Mundo et al. .......... | 411/34 |
| 5,044,852 A | * | 9/1991 | Sweeney et al. .............. | 411/82 |
| 5,375,953 A | | 12/1994 | Krug et al. .................... | 411/43 |
| 5,473,806 A | | 12/1995 | Krug et al. .................... | 29/458 |
| 5,483,781 A | * | 1/1996 | Ernst et al. .................. | 411/82 |
| 6,035,595 A | * | 3/2000 | Anderson ..................... | 411/82 |
| 6,474,910 B2 | * | 11/2002 | Lay .............................. | 411/82 |
| 6,732,420 B2 | * | 5/2004 | Wang et al. .............. | 29/525.13 |

OTHER PUBLICATIONS

McGrath, Gareth; Jones, I. A., Hilton, P. A.; Kellar, E.J.C. and Taylor, A.; Sallavanti, P. "New Advances in Plastics Joining for High Speed Productin", 2001–01–3398, 6 pages.

* cited by examiner

Primary Examiner—David P. Bryant
(74) Attorney, Agent, or Firm—Kathryn A. Marra

(57) ABSTRACT

Mechanical and adhesive charged blind fasteners have an annular one way flat or O-ring seal mounted at one end of a cylindrical rivet body sealingly engaged with an axially extending mandrel stem to provide a torodial chamber. The body has radial adhesive-extruding openings therethrough around which a vacuum may be established for initial adhesive charging purposes. For charging, the seal is deflected by the force of a flow of adhesive from a supply responding to the establishment of a positive pressure differential between the supply and the exterior of the body. With the torodial chamber opened, viscous adhesive readily flows therein from the supply. After being filled, the vacuum is terminated and the seal naturally recovers and closes the body to confine the adhesive therein. Adhesive charging can be achieved by other mechanisms that impress a load on the supply to effect seal opening.

4 Claims, 4 Drawing Sheets

BLIND RIVET WITH ADHESIVE FOR JOINING AND ADHESIVE CHARGING METHOD

TECHNICAL FIELD

This invention relates to integrated mechanical and adhesive fastener units and more particularly to a new and improved blind rivet charged with a fastening adhesive to mechanically and adhesively effect an optimal joint connecting a plurality of parts together and further to new and improved methods of charging blind rivets with an adhesive for optimizing fastener unit manufacture, usage and performance.

BACKGROUND OF THE INVENTION

Prior to the present invention various fastening units and procedures have been devised and employed in metal fabrication to improve connection of components to one another. For example blind fasteners and resistance spot welds have been utilized for joining discrete sheets of aluminum and alloys thereof so that lightweight assemblies can be manufactured. Such connections were often instituted for significant weight reduction in a wide range of applications, for example in automotive vehicles where weight reduction translates into increased operating fuel economy.

Adhesives have also been incorporated into mechanical fastener units to improve connections in other applications. In US patents to Krug et al: U.S. Pat. No. 5,375,953 issued Dec. 27, 1994 for Blind Rivet and U.S. Pat. No. 5,473,806 issued Dec. 12, 1995 for Method of Preventing Cold Welding Especially of Blind Rivets, laterally spaced retention grooves are provided in the mandrels of blind fasteners to carry curable adhesives that cooperates with the mechanical connecting aspects of the rivet to effect an optimized fastening of multiple components. In US patent to Newton U.S. Pat. No. 3,772,957 issued Nov. 20, 1973 for Self Drilling and Sealing Rivet, discrete chambers are specially formed between a self-drilling mandrel and the cylindrical body of the rivet to separate resin and hardener components of an epoxy for subsequent intermixing and curing to augment mechanical fastening. In U.S patent to Del Mundo et al U.S. Pat. No. 4,659,268 issued Apr. 21, 1987 for Composite Blind Fastener, concentric annular receptacles are provided in the end of a blind rivet for the discrete epoxy components which are intermixed when the rivet is set to effect a combination mechanical and adhesive connection between a pair of plates.

While these prior constructions and methods are appropriate to meet their objectives, they generally are difficult to produce and have exposed adhesives or various mandrel modifications to separate the resin and hardener portions of the epoxy. Accordingly they do not meet new and higher standards for the economical and sealed packaging of the adhesive within the blind fastener nor the new and improved blind fastener connection augmented by the adhesive connection provided by a predetermined sealed charge of adhesive. More particularly, the prior art does not disclose or suggest the new and improved methods of charging a blind fastener unit with an adhesive such as provided in the present invention.

SUMMARY OF THE INVENTION

The present invention is drawn to new and improved mechanical and adhesive fastener units and more particularly to a new and improved adhesive-filled and sealed blind rivet that is operative to effectively join a plurality of components to one another by the mechanical connection of the rivet as augmented by the connecting properties of the adhesive. Moreover, this invention is further drawn to new and improved methods of charging blind rivets with adhesives for enhancing the production of adhesive charged rivets and for improving blind rivet construction optimizing use thereof in the subsequent connection of parts. In this invention the adhesive is fully encapsulated and protected within the confines of the rivet until the rivet is positioned and set to join separate parts.

BRIEF DESCRIPTION OF THE DRAWINGS

These and other features objects and advantages will become more apparent from the following detailed description and drawings in which:

FIG. 6c is an enlarged pictorial view of an encircled portion of FIG. 6a;

DESCRIPTION OF THE PREFERRED EMBODIMENT

Figure 1:
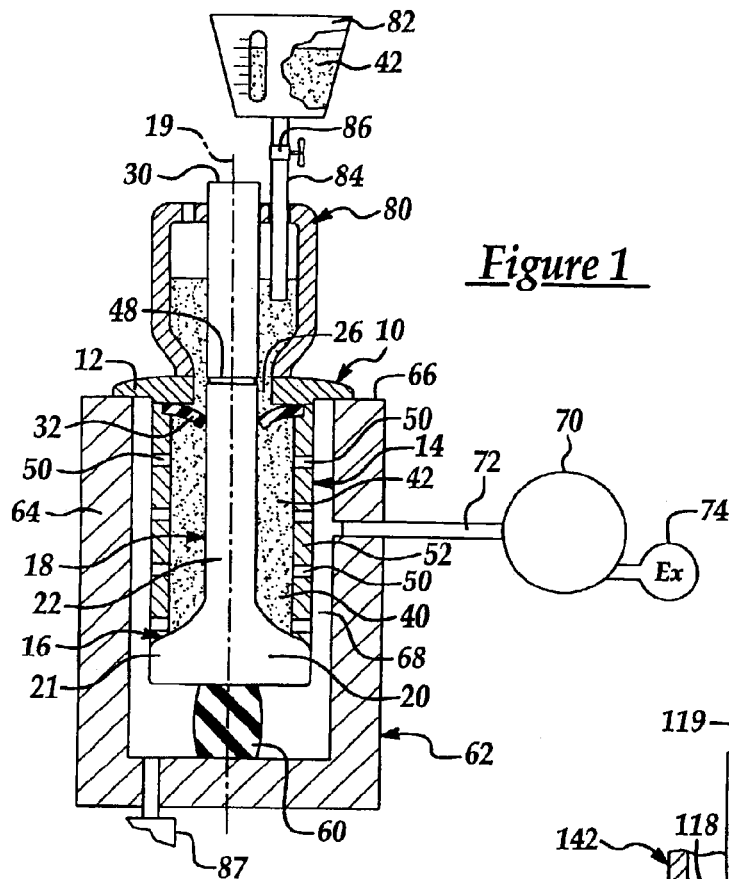
FIG. 1 is a diagrammatic and cross-sectional view of one embodiment of the invention illustrating a blind rivet assembly being charged with an adhesive.
Figure 1A:
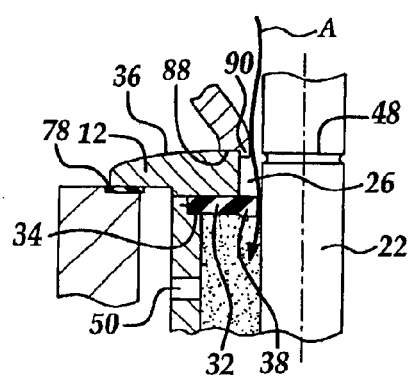
FIG. 1a is fragmental view of a portion of FIG. 1.

Turning now in greater detail to the drawings FIGS. 1 and 1a illustrate a blind fastening rivet 10 having a dome-like top cap 12 with depending body portion 14 formed by a cylindrical wall extending from connection with the flattened bottom seating surface of the cap to a deformable distal or tail end 16. The blind rivet includes an elongated mandrel 18 extending along the central axis 19 thereof having an enlarged head 20 at the lower or blind end thereof. The head 20 is generally conical in form and is operatively disposed at the distal end of the cylindrical body portion 14. From an enlarged annular swaging portion 21 extending radially outward of the distal end of the body portion, the mandrel head 20 tapers upwardly and within the cylindrical body portion 14 progressively and radially diminishing until it integrates with a solid cylindrical pull shaft or drive pin 22 that extends upwardly and within the cylindrical body portion. As illustrated the pull shaft extends along the central axis 19 of the body portion and out though an aligned annular passageway or opening 26 formed in the cap 12 of the rivet to a terminal outer end 30.

Disposed immediately below the rivet cap 12 is an annular flattened upper annular seal 32 of a suitable elastomer or other material, that has high-quality resilience, sealing properties and service life for operation as a one-way valve to admit and retain a dormant and viscous adhesive within the body portion of the rivet. This seal is peripherally mounted in a circular retaining groove 34 radially formed at the upper end of the cylindrical wall of the body portion or operatively secured by an adhesive to the flat bottom surface 36 of the rivet cap 12 as best illustrated in FIG. 1a. In any event the seal is operatively mounted immediately below the cap 12 and extends radially inward past the passageway 26 therein until it terminates in an annular inner sealing lip 38 that normally is in peripheral sealing contact with the outer surface of the pull rod 22. The cylindrical body portion 14 of the rivet cooperates with the upper seal 32 and the swaging head and pull shaft of the mandrel to define a generally torodial chamber 40. This chamber is sized to hold a predetermined quantity of adhesive 42 for subsequent use in the connection of a plurality of workpieces to one another such as aluminum alloy sheets 44, 46 and 47 illustrated in FIG. 7.

The pull rod of the mandrel may be scored, notched or otherwise weakened at a predetermined point to provide a weakened area such as at break line 48 to facilitate breakage of the rod at that point. This break occurs on the continued application of installation force subsequent to the completion of the setting of the blind rivet securing multiple work pieces to one another. This break line can be at any position along the length of the pull shaft such as outboard of the seal and encompassed by annular passageway 26 to optimize joint strength, sealing and appearance.

The adhesive may be selected from a wide range of commercial adhesives and sealing material having a viscosity suitable for forced flow thorough the small opening or extrusion holes 50 radially extending through the cylindrical wall 52 of the body portion 14 of the rivet when the mandrel is pulled to set the rivet. In this embodiment, the adhesive has sufficient surface tension so that it will not normally leak through the openings 50 such as during storage or while the charged rivets are being handled. The adhesive may be a one-part heat curable adhesive in which the cure temperature is high enough so that there will be no premature curing thereof during storage but low enough to prevent damage to any polymer based composites being joined or deformation of any substrates of materials such as aluminum during cure.

Also the adhesive 42 may be a fastener adhesive such as Scotch-Grip™, a two part epoxy comprising a bulk adhesive and a curative. This adhesive is activated in response to the shearing thereof. One part is microencapsulated and mixed with the second part to form slurry. This slurry can be supplied and stored as a dormant fastener adhesive within the cylindrical body of the rivet for subsequent bonding operation to augment mechanical fastening when the rivet is employed to join separate materials. Accordingly, after the rivet is inserted in the rivet opening formed in the materials to be joined and the rivet is being set, shearing action occurs within the adhesive. Such action may take place when the swaging head 20 enters and deforms the rivet body as well as when the slurry flows through the restrictions presented by radial openings 50 and into the opening drilled or otherwise formed in the parts being formed. The edges of openings 50 may be rough or irregular as diagrammatically illustrated in FIG. 6c to improve shearing. The shearing action results in rupture of some of the microcapsules and the ensuing mixture of the adhesive with the curative or hardener. The mixed epoxy then cures at ambient temperature and effects the adhesive attachment of the parts to one another materially supplementing the mechanical connection. Another adhesive that incorporates microcapsules of an adhesive material dispersed throughout a binder that is suitable for this invention is known and is commercially available as Loctite Driloc™. Many other types of adhesives can be employed in this invention, particularly those that can be contained in a dormant or inactive state within the rivet in a substantially sealed reservoir.

FIGS. 1 and 1a illustrate one preferred method of charging the blind rivet with a predetermined quantity of adhesive 42. As shown a blind rivet or fastener 10 is mounted on a resilient pedestal 60 of an adhesive charging container or vessel 62 having an annular and upwardly extending side wall 64 terminating in a flat annular top surface 66 and defining a chamber 68. The flat bottom surface 36 of the upper cap 12 of the blind rivet seats on an upper annular seal 78 disposed in the top surface and around the access opening of the chamber 68. With the rivet 10 extending into the chamber as illustrated in FIG. 1, the upper seal 32 cooperates with the cap of the blind rivet and the mandrel shaft to operate as a one-way flap valve to admit adhesive into the chamber 68 and subsequently to recover and achieve the sealing thereof so that the blind rivet can be effectively charged with the adhesive 42. This charge is achieved by forcing the adhesive past the seal 32 deflected thereby and into the torodial chamber 40 of the rivet and then allowing the seal to recover to its natural state.

The chamber 68 of the rivet support vessel 62 is operatively connected to a radial air pump 70 by a line 72 that is selectively operative to pump air from the chamber and exhaust it into the atmosphere by way of exhaust 74. Operation of the air pump establishes a vacuum or low-pressure condition within the chamber 68 sufficient to effect the adhesive charging of the body portion of the rivet. More particularly, the adhesive may be supplied into the blind fastener by way of a feeding fixture 80 connected to a reservoir 82 containing a supply of adhesive 42 via adhesive feed line 84 having a control valve 86 operatively connected therein. The feed fixture 80 has a forward contact face 88 with a projecting annular collar portion 90 that respectively sealingly contacts the upper surface of the head 12 and the annular wall of the head defining annular opening 26.

To charge the rivet with an adhesive, an unfilled blind rivet is placed in the container or rivet support and fill vessel 62; subsequently the fixture 80 is placed in an adhesive feed position on the cap of the rivet as illustrated in FIG. 1. The pump 70 is energized to establish a vacuum in chamber 68. Valve 86 is opened and adhesive is fed into the fixture. Because of the established pressure differential, atmospheric pressure acts on the measured quantity of adhesive supplied to the fixture. The pressurized adhesive causes the upper seal 32 to act as a one-way flap valve by flexing or be otherwise displaced to an open position, such as shown in FIG. 1a, so that the adhesive in the supply fixture flows past the seal into the torodial chamber 40, filling it. This flow is diagrammatically shown in FIG. 1a, as flow arrow A. A valved drain 87 can be opened to facilitate removal of any excess adhesive from the container 62. The pump 70 is deenergized after a predetermined time or when a measured quantity of adhesive has been supplied into the rivet and the chamber 40 is opened to atmospheric pressure. Under these conditions, the seal recovers and closes on the stem of the mandrel to effect the sealing of the adhesive in the chamber. The filling fixture is taken off of the rivet and the adhesive filled rivet is removed from the container and packaged for subsequent use for double action fastening as pointed out above.

Figure 2:
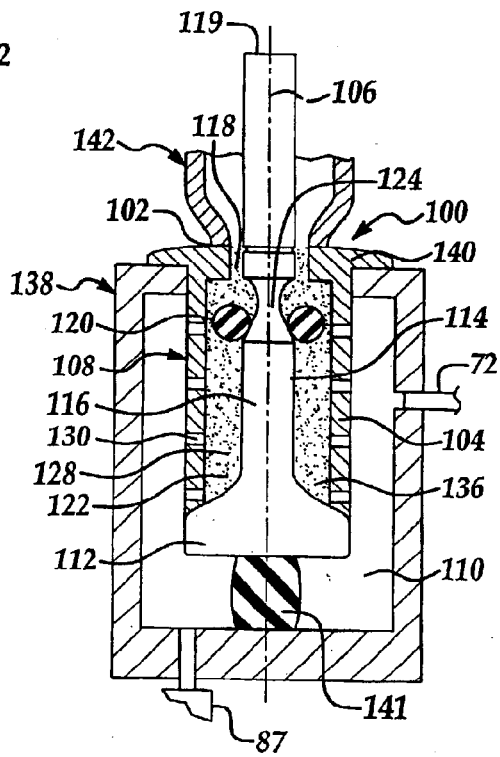
FIG. 2 is a view similar to the view of FIG. 1 illustrating another embodiment of the invention.
Figure 2A:
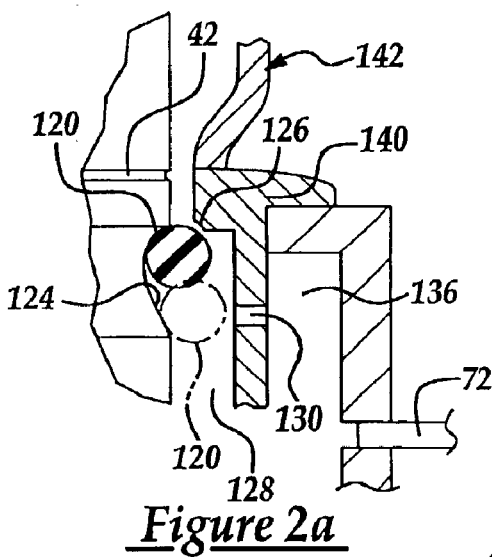
FIG. 2a is an enlarged view of a fragment of FIG. 2 illustrating the O-ring and the sealing seat therefor that can operatively engage to seal adhesive within a blind rivet.

FIGS. 2 and 2a illustrate another embodiment of this invention in which a blind fastener 100 is formed with a rounded cap 102 and a depending cylindrical wall 104 turning about a central axis 106 to define a main body 108. The main body terminates in deformable distal or blind end 110 that is adapted to be distorted by the head 112 of an elongated mandrel 114 of the blind fastener. As in the previous embodiment the mandrel head 112 has a conical configuration that extends from an operating position at the distal end of the main body portion into connection with an elongated shaft or pull rod 116 that projects axially upward in the body portion and out through a circular opening or passageway 118 in the head to a terminal end 119. This embodiment of the blind fastener utilizes an O-ring 120 of a suitable elastomer or other resilient material to provide for the upper sealing and the one way valving for the optimized filling of the blind fastener 100 with an adhesive 122. The seals of this invention, such as O-ring 120, further yieldably hold the associated mandrel in position in which the mandrel head closes the lower end of the main body portion of the rivet.

As illustrated in FIGS. 2 and 2a, the O-ring 120 is operatively mounted in an annular ramped retaining groove 124 formed in the shaft or pull rod 116. This O-ring is normally in sealing contact with an inner annular sealing seat 126 in fastener cap 102 and defining the inboard end of the passageway opening 118. With the mandrel in position in the body 108, a torodial chamber 128 is formed for receiving a predetermined quantity of the adhesive 122. Radial openings 130 extending through cylindrical wall 104 are sized to normally prevent flow of the viscous adhesive therethrough to inhibit or severely limit the amount of material present on the exterior of the main body so that charged rivets can be readily handled packaged and subsequently used. As in the previous embodiment, these holes however are engineered to provide a good flow and distribution of the adhesive into the joint connecting different parts on setting of the blind fastener 100.

The adhesive charging system of FIGS. 2, 2a is substantially the same as in FIGS. 1 and 1a and comprises a rotary air pump selectively operable to effect the establishment of a low pressure within a chamber 136 of adhesive charging vessel 138 on which the blind fastener 100 is mounted. As in the first embodiment the cap 102 is in sealed engagement with the upper surface of the vessel 138 and the fastener body 108 extends through a top opening therein defined by cylindrical wall 140 and down into the chamber 136 where the mandrel head seats on a resilient support 141 mounted to the bottom of vessel 138.

On establishment of a predetermined vacuum in vessel 138 from operation of a vacuum establishing device such as rotary pump 70 of FIGS. 1 and 1a, pressurized adhesive from a fixture 142 will flow toward the low pressure and displace or distort the O-ring 120. When O-ring 120 is displaced from sealing engagement with seat 126 as diagrammatically shown in FIG. 2a, torodial chamber 128 is opened to a flow of adhesive from supply fixture 142 mounted on the end cap of the rivet as more completely set forth in connection with the embodiment of FIG. 1.

As in the previous embodiment the surface tension and high viscosity of adhesive 122 is such that the adhesive will not normally flow through the radial openings 130 formed in the cylindrical wall of the body portion 104 of the rivet. Moreover after a predetermined quantity of adhesive or sealant has been admitted into this chamber 128, the pump is deactivated and the recovery forces of the O-ring in the ramped groove and the pressure of the sealant within the chamber sealing effect the return of the O-ring to its sealing position thereby closing the adhesive filled cavity. The adhesive-charging fixture 142 is removed from the blind fastener, which in turn is removed from the charging vessel and packaged or otherwise prepared for use.

Figure 3:
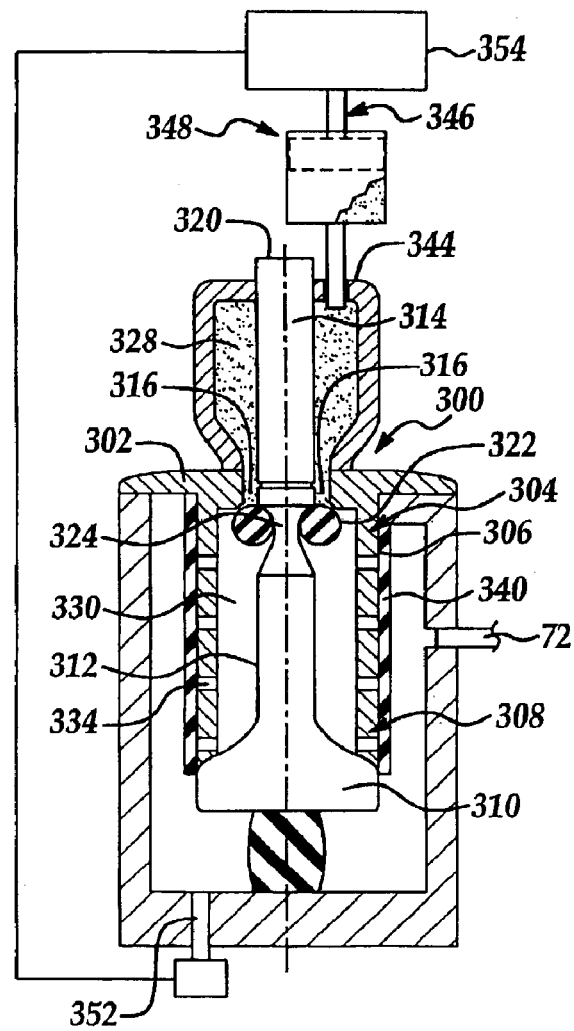
FIG. 3 is a pictorial view of still another embodiment of the invention.
Figure 4:
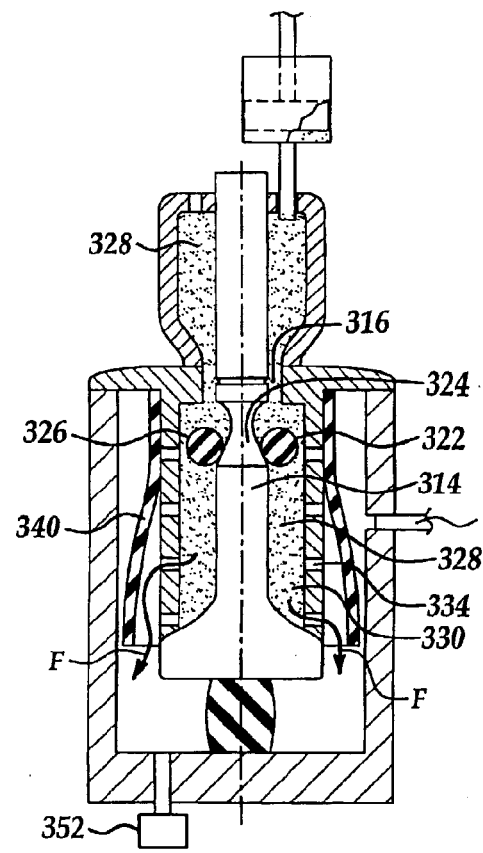
FIG. 4 is another view of the FIG. 3 embodiment of the invention illustrating operation of the rivet charging system.
Figure 5:
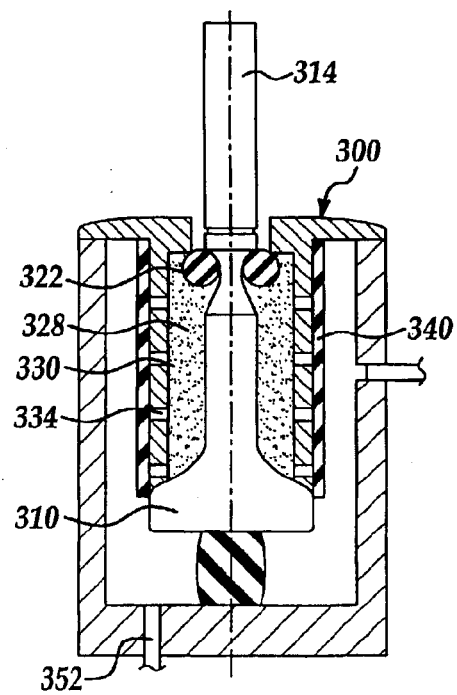
FIG. 5 is another view of the FIG. 3 embodiment illustrating a rivet fully charged with an adhesive.

FIGS. 3, 4 and 5, illustrate another embodiment of the invention in which a blind rivet fastener 300, similar to the embodiment of FIGS. 2, 2a comprises a rounded top cap 302 with a depending body 304 defined by a cylindrical wall 306 that terminates in a deformable distal end 308. As in the other embodiments, the deformable end is adapted to be radially expanded by the head 310 of an elongated mandrel 312 for the attachment of a plurality of sheets or other components to one another. More particularly the mandrel head is conical in shape and extends from an endmost enlarged portion disposed outboard of the distal end of the body portion into the center of the cylindrical body 304 where it connects with the cylindrical pull shaft 314 that extends axially and upward through an annular opening 316 extending axially through the cap 302 of the rivet to a terminal end 320.

As in FIGS. 2 and 2a, the embodiment of FIGS. 3–5 has an elastomeric O-ring seal 322 operatively mounted in an annular seal retention groove 324 formed in the pull shaft 314. The O-ring seal normally engages the annular seat 326 in the cap 302 at the inner end of the annular opening 316 to seal adhesive material 328 within the torrordial chamber 330 of the rivet body 304. As in the other embodiments, the cylindrical body of the rivet is formed with a plurality of radial holes 334 sized and located for the optimized distribution of adhesive to predetermined locations in the joint of the material being adhesively connected. In contrast to the previous embodiment however these holes 334 can be formed within a wide diametrical range since other provisions are made to effectively retain the adhesive within the torodial chamber 330 of the rivets. With this arrangement, openings including a family of openings of varying sizes including openings having diameters appreciably larger that the holes of the prior embodiments can be formed in the cylindrical wall. Holes roughened, scored or provided with edges to increase adhesive shearing can be employed. This importantly provides for the use of a wide range of adhesives and a freer passage of large quantities of such adhesives into the connecting joint.

To this end, the cylindrical body 304 of the rivet 300 is covered or banded with a cylindrical sheet 340 of resilient sheet of elastomer or other suitable resilient material. In its original state the cylindrical sheet 340 fits tightly around the rivet body to cover and close the radial openings or holes 334. This sheet is selected from material having sufficient resilience and service life to augment the filling and retention of adhesive within the rivet.

The adhesive material 328 is supplied to blind fastener by way of a fixture 344 that is operatively mounted on top cap 302 of the rivet in a sealed manner. A predetermined quantity of material 328 is forced by stroking a powered piston 346 operatively mounted in a supply 348 to cause the deflection of or the downward displacement of the O-ring 322 from the sealing seat so that adhesive from the supply will be forced to flow into the torodial chamber 330. When the chamber 330 is filled, any excess flow, arrows F will deflect the sleeve or sheet 340, such as diagrammatically shown as an outward flaring or bulging in FIG. 4, and flow into the chamber of the vessel. A sensor 352 can be mounted in an appropriate location in the bottom of the vessel to detect any spillage or leakage overfill adhesive. This sensor can be connected to a control 354 that is operable to immediately effect the closure or shut down of the adhesive feed system. The O-ring recovers to seal the filled chamber.

The elastomer sheets may comprise sacrificial elements in some instances. Accordingly the sheet may be sufficiently thin and weak so that it will burst on rivet installation and allow the adhesive to readily pass into the rivet hole for adhesive joining purposes. The sheet may also be formed with small holes or weakened areas that open under pressure from the adhesive so that it will readily pass through the sleeve when the rivet is being set to augment the mechanical fastening. Moreover, the sleeve can be stripped from or otherwise removed prior to or during the setting of the rivet as part of the installation process.

Figure 6A:
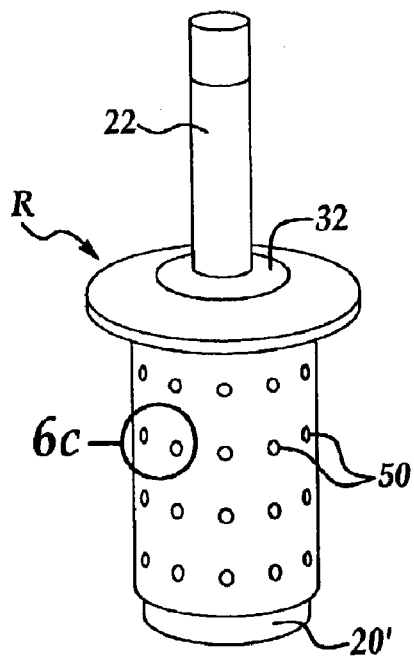
FIG. 6a is pictorial view of the blind rivet of rivet of the FIG. 1 embodiment before installation.
Figure 6B:
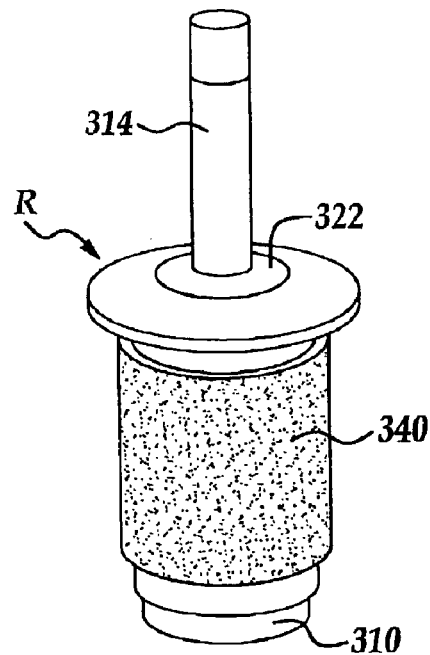
FIG. 6b is a pictorial view of the blind rivet of the FIG. 3 embodiment before installation.
Figure 6C:
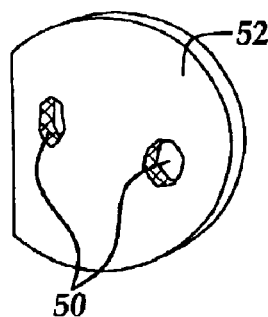
Figure 7:
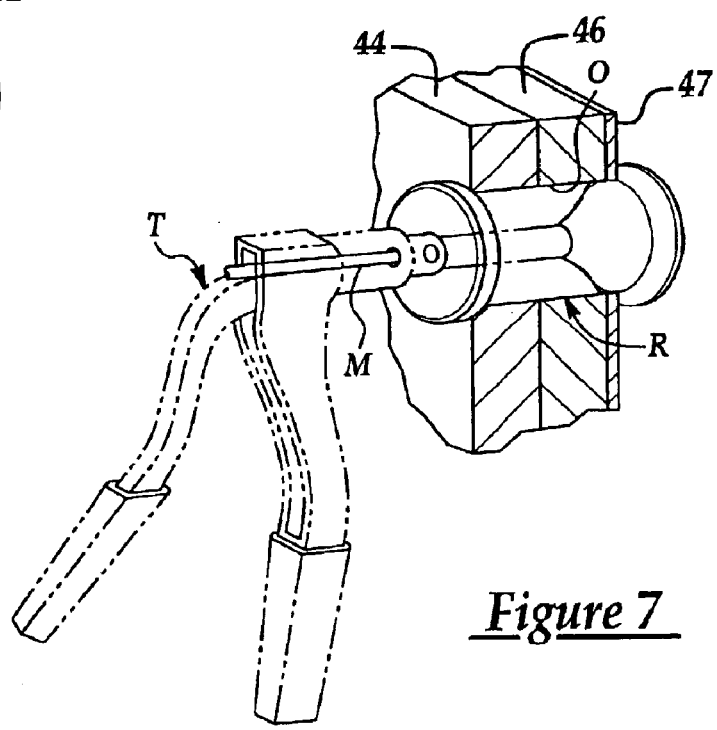
FIG. 7 is a pictorial view partly broken away illustrating the installation of blind rivets according to this invention to secure components to one another.

FIG. 7 best illustrates the installation of a blind fastener in the form of a blind rivet of FIGS. 6a and 6b made in according to this invention. More particularly, FIG. 7 diagrammatically illustrates an installation tool T placed onto rivet R, corresponding to those of FIGS. 6a, 6b to fasten a plurality of sheets 44, 46 and 47 to one another. As shown the rivet tool T is set to receive and grip the upper end of the pull rod of the mandrel of the rivet R that is operatively inserted into a sized cylindrical opening or through-passage O drilled, punched or otherwise formed through the overlay of the sheets 44, 46, 47. The rivet tool T is manually or power operated to engage the extending end of the mandrel with a vice like grip. As the handles of the tool are squeezed and brought together, the mandrel is pulled into the tool that is firmly seated on the rivet cap mounted on the upper sheet 44. This force causes the deforming or swaging head to flatten or otherwise effect the annular distortion of the distal end of the rivet so that it radially bulges and flattens against the outer surface of lower sheet 47. The compression loads capturing the sheets between the head of the rivet and the deformed end of the body of the rivet are effective to hold the separate sheets tightly against one another. Moreover the tensile forces impressed on the pull shaft effect the breaking the mandrel at a predetermined point established by the score line to establish a high quality rivet joint.

This mechanical connection is materially augmented by the adhesive connection from the epoxy or other adhesive material that is forced and extruded through the openings such as 50, 130 and 334 while the rivet is being set. More particularly as the tapered head of the mandrel moves axially within the body of the rivet, a quantity of the epoxy is displaced and forced through these openings. This adhesive material appropriately flows into interface areas between the sheets as well as between the cylindrical clearance defined between the cylindrical body of the rivet and the cylindrical wall of the through-passage or opening O extending through the overlapped sheets. After curing, the adhesive securely bonds the parts together and the blind rivet in the opening therefore.

While the invention has been shown and described with reference to preferred methods and embodiments, it will be understood by those skilled in the art can now make various modifications and alternatives to that which has been shown and described without departing from the scope and spirit of the invention.

What is claimed is:

1. A method of making a blind rivet for mechanically and adhesively connecting a plurality of separate parts to one another comprising the steps of forming a main body portion having a cap portion and a depending cylindrical body portion depending from said cap portion to a lower deformable end, said cylindrical wall and cap portions cooperating to define a chamber, and an upper passage through said cap portion connecting into said chamber and providing an axial passageway through said main body portion, providing a mandrel for said rivet having an enlarged deforming head at one end thereof and an elongated pull shaft extending therefrom, inserting said mandrel into said main body so that said deforming head closes said chamber and is adjacent to the lower deformable end of said body portion and said pull shaft extends through said axial passageway, installing a resilient and displaceable seal for said body portion in the upper end of said cylindrical wall portion and sealingly engaging said pull shaft, and displacing said seal by flowing a quantity of adhesive into said chamber, terminating the flow of adhesive into said chamber so that said seal can recover to its original sealing position and trap said adhesive within said chamber.

2. The method of claim 1 wherein said rivet is placed in an adhesive charging fixture so that said body extends into a cavity therein and evacuating air from said cavity to establish a vacuum around said body and thereby effect deflection of said seal by the pressurized flow of said adhesive past said deflected seal to fill said chamber with said adhesive, pressurizing said cavity to allowing said seal to recover and thereby trap said adhesive within said chamber, and then removing said adhesive filled rivet from said chamber.

3. A method of charging a blind rivet with an adhesive so that it can be subsequently set to mechanically and adhesively connect a plurality of workpieces to one another comprising the steps of: providing a rivet body having a head portion and a generally cylindrical shank portion disposed about a central axis which terminates in a deformable end portion that cooperatively define a chamber in said shank portion and a connecting passageway in said head portion, providing a mandrel having an elongated stem with a gripping surface at one end thereof and a deforming head at the other end thereof, inserting said mandrel into said rivet body so that said stem extends along said axis through said chamber and said connecting passageway in said head portion with the deforming head being operatively disposed within said deformable end portion and said gripping surface extending outboard of said head portion, installing an annular seal in said cylindrical shank portion adjacent to said head portion so that it sealingly contacts said elongated stem to establish a sealing position to seal said chamber, feeding a quantity of adhesive material into said chamber by deflecting said seal from said sealing position, terminating the feed of adhesive into said chamber and allowing said seal to recover to its sealing position thereby confining said adhesive within said chamber.

4. The method of claim 3 wherein said rivet is placed in an adhesive charging fixture so that said body extends into a cavity therein and evacuating air from said cavity to establish a vacuum around said body and thereby effect deflection of said seal by the pressurized flow of said adhesive past said deflected seal to fill said chamber with said adhesive, pressurizing said cavity to allowing said seal to recover and thereby trap said adhesive within said chamber, and then removing said adhesive filled rivet from said chamber.

* * * * *